US011996687B2

United States Patent
Agliata et al.

(10) Patent No.: US 11,996,687 B2
(45) Date of Patent: May 28, 2024

(54) PWM CONTROL FOR POWER DISTRIBUTION CIRCUIT INTERRUPTING DEVICES

(71) Applicant: Hubbell Incorporated, Shelton, CT (US)

(72) Inventors: Peter Michael Agliata, Birmingham, AL (US); Rohan J. De Fonseka, Ocean, NJ (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 17/156,257

(22) Filed: Jan. 22, 2021

(65) Prior Publication Data

US 2021/0234360 A1 Jul. 29, 2021

Related U.S. Application Data

(60) Provisional application No. 63/046,387, filed on Jun. 30, 2020, provisional application No. 62/965,579, filed on Jan. 24, 2020.

(51) Int. Cl.
*H02H 3/08* (2006.01)
*H01H 33/60* (2006.01)
(Continued)

(52) U.S. Cl.
CPC ............. *H02H 3/08* (2013.01); *H01H 33/60* (2013.01); *H01H 71/10* (2013.01); *H02H 3/06* (2013.01)

(58) Field of Classification Search
CPC .. H02H 3/00; H02H 3/02; H02H 3/06; H02H 3/063; H02H 3/066; H02H 3/07;
(Continued)

(56) References Cited

U.S. PATENT DOCUMENTS 4,704,652 A * 11/1987 Billings ................. H01H 9/542
361/13
5,341,265 A 8/1994 Westrom et al.
(Continued)

FOREIGN PATENT DOCUMENTS

EP 0580285 1/1994

OTHER PUBLICATIONS

International Search Report and Written Opinion mailed in PCT/US21/14739 dated Apr. 8, 2021, 6 pgs.
(Continued)

*Primary Examiner* — Thienvu V Tran
*Assistant Examiner* — Carlos O Rivera-Perez
(74) *Attorney, Agent, or Firm* — Wissing Miller LLP

(57) ABSTRACT

The present disclosure provides controllers for power distribution network circuit interrupting devices and provides electronic control circuits for inclusion in such controllers. The electronic control circuit has a boost circuit, a capacitor storage unit and a pulse width modulator control circuit. The boost circuit boosts an input voltage to a value to supply sufficient energy to a protective relay solenoid to energize the solenoid. The capacitor storage unit stores the boosted voltage from the boost circuit. The pulse width modulator control circuit is responsive to a control and enable circuit to selectively enable energy from the capacitor to energize the one or more protective relays in power distribution system circuit interrupting device.

18 Claims, 9 Drawing Sheets

(51) Int. Cl.
*H01H 71/10* (2006.01)
*H02H 3/06* (2006.01)

(58) Field of Classification Search
CPC .......... H02H 3/08; H02H 3/083; H02H 3/087; H02H 3/093; H02H 3/10; H02H 3/105; H02H 7/00; H02H 7/04; H02H 7/042; H02H 7/045; H02H 7/05; H02H 7/10; H02H 7/12; H02H 7/1213; H02H 7/22; H02H 7/222; H02H 1/00; H02H 1/0061; H02H 1/04; H02H 1/043; H02H 1/06; H02H 1/063; H02H 1/066; H01H 33/60; H01H 71/10; H01H 71/009; H01H 71/1045; H01H 71/1072; H01H 71/1081; H01H 71/109; H01H 71/12; H01H 71/121; H01H 75/00; H01H 75/02; H01H 75/04; H01H 75/06; H01H 75/10; H01H 47/00; H01H 47/22; H01H 47/32; H01H 47/36; H01H 47/325; H02M 7/00; H02M 7/02; H02M 7/04; H02M 7/155; H02M 7/1552; H02M 7/1555; H02M 7/1557; H02M 5/40; H02M 5/42; H02M 5/45; H02M 5/4505; H02M 5/458; H02M 5/4585; H02M 3/00; H02M 3/04; H02M 3/135; H02M 3/137; H02M 3/155; H02M 3/1552; H02M 3/1555; H02M 3/156; H02M 3/158; H02M 3/1588; H02J 9/00; H02J 9/04; H02J 9/06; H02J 9/062
USPC ........... 361/1, 59–66, 71–75, 93.1–100, 102; 323/271–277, 282–285, 351; 363/34, 35, 363/41, 50–58, 123, 124
See application file for complete search history.

(56) References Cited

U.S. PATENT DOCUMENTS

| | | |
|---|---|---|
| 2002/0179571 A1 | 12/2002 | Rhein et al. |
| 2006/0274468 A1 | 12/2006 | Phadke |
| 2008/0247105 A1 | 10/2008 | Divan |
| 2009/0015234 A1* | 1/2009 | Voisine ................ H01F 27/422 |
| | | 323/355 |
| 2010/0332865 A1 | 12/2010 | DuBose |
| 2012/0019971 A1 | 1/2012 | Flaherty et al. |
| 2012/0262140 A1 | 10/2012 | Divan |
| 2018/0261412 A1* | 9/2018 | Schaper .................... H02J 9/06 |
| 2019/0080868 A1* | 3/2019 | Riley ..................... H01H 50/54 |
| 2020/0099218 A1 | 3/2020 | Adams |

OTHER PUBLICATIONS

Viper-S Three Phase Reclosers, G & W Electric Company, www.gwelec.com, Aug. 2018, 12 pgs.

Versa-Tech Il Recloser, Catalog 10EE, Hubbell Power Systems, www.hubbellpowersystems, Jan. 2014, pp. 20.

Smart Recloser Circuit Breaker Project Report, Worcester Polytechnic Institute, Apr. 29, 2009, pp. 54.

SmartClose 3-Phase, Synchronous Close Vacuum Capacitor Switch, Installation Instructions, Hubbell Power Systems, www.hubbellpowersystems, 2013, pp. 8.

International Preliminary Report on Patentability mailed in PCT/US21/14739 filed Jul. 26, 2022 (5 pages).

* cited by examiner

PWM CONTROL FOR POWER DISTRIBUTION CIRCUIT INTERRUPTING DEVICES

CROSS REFERENCE TO RELATED APPLICATIONS

The present disclosure is based on and claims benefit from U.S. Provisional Patent Application Ser. No. 62/965,579 filed on Jan. 24, 2020 entitled "PWM Control for Power Distribution Circuit Interrupting Devices" and from U.S. Provisional Application Ser. No. 63/046,387 filed on Jun. 30, 2020 entitled "PWM Control for Power Distribution Circuit Interrupting Devices" the contents of each are incorporated herein in their entirety by reference.

BACKGROUND

Field

The present disclosure generally relates to circuit interrupting devices used with electrical power distribution systems as protection against fault currents or switching current surges. More particularly, the present disclosure relates to electronic control circuits for energizing and de-energizing such circuit interrupting devices.

Description of the Related Art

A frequent problem in almost any electrical power distribution system is a momentary disruption of electrical service that may be caused by environmental conditions. For example, 1) lightening may strike in the vicinity of power lines, or 2) wind may cause power lines strung between poles to momentarily touch each other or to touch a grounded conductor shorting the lines, or 3) objects may fall across exposed wires and short the lines. Such events may cause a momentary power line short circuit or current surge. Most of these faults are self-correcting and do not significantly disrupt power distribution. However, some events are more serious and can trigger fault-interrupting devices to trip, causing a more serious power disruption.

For example, reclosers are inserted into power lines to protect a power distribution system. A recloser is a fault-interrupting device used to sense current, voltage, and/or frequency and isolate faulted portions of power distribution conductors. A recloser control device operates a recloser, which can be an electronic controller that drives a protective relay in the recloser to open or close the recloser. Traditional recloser control devices use a capacitive device to supply energy to energize or de-energize the protective relay. Such capacitor has to be recharged after each operation of the recloser. However, reclosers typically perform a series of two or more operations during a fault condition, causing the recloser to operate until the fault condition self corrects or the recloser performs multiple operations until the recloser opens or locks out. Waiting for the recloser to recharge before each operation of the recloser may increase the intermittent power outages during operations of the recloser in the power distribution network.

SUMMARY

The present disclosure provides exemplary embodiments of controllers for power distribution systems and to electronic control circuits for inclusion in such controllers. In an exemplary embodiment, the electronic control circuit includes a boost circuit, a capacitor storage unit and a pulse width modulator control circuit. The boost circuit is used to boost an input voltage that is then stored in the capacitor storage unit. The pulse width modulator control circuit is responsive to an input pulse from a control and enable circuit that selectively enables energy from the capacitor to energize the one or more protective relays in a power distribution system circuit interrupting device.

The present disclosure also provides controllers for power distribution network circuit interrupting devices that include programmable electronic control circuits used to control power distribution systems circuit interrupting devices. The electronic control circuit has a boost circuit, a capacitor storage unit and a pulse width modulator control circuit. The boost circuit may boost an input voltage by a factor of about 750 percent. The capacitor storage unit stores the boosted voltage from the boost circuit. The pulse width modulator control circuit is responsive to a control and enable circuit to selectively enable energy from the capacitor to energize the one or more protective relays in power distribution system circuit interrupting device.

Each manufacturer of power distribution network circuit interrupting devices, e.g., distribution switchgear, typically uses different internal components with a range of voltage, current, and pulse requirements in order to actuate the circuit interrupting device. It is common for end users, i.e., electrical utilities, to install circuit interrupting devices from many manufactures of distribution switchgear into the power grid. It is also common for such end users to install a controller for such circuit interrupting devices from a single manufacturer. The reason for this trend is that the controllers are more complex to learn and operate. However, each type of circuit interrupting device may have different voltage, current, and pulse requirements in order to actuate the various circuit interrupting devices. This leads the utility to maintain numerous versions of the controllers needed to drive the various circuit interrupting devices. Having a controller with a programmable electronic control circuit reduces the inventory of controllers a utility may need to stock reducing costs.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides exemplary embodiments of controllers for power distribution network circuit interrupting devices and to electronic control circuits for inclusion in such controllers. The circuit interrupting device controllers can be distributed individually, as part of a power distribution system circuit interrupting kit, or the controllers can be integrated with or into various power distribution system circuit interrupting devices. For example, the controller may be integrated into an automatic circuit recloser (ACR).

The controllers for power distribution systems circuit interrupting devices contemplated by the present disclosure include, but are not limited to, automatic circuit recloser control systems, load break switch controllers, capacitor switch controllers, sectionalizers and fault interrupter controllers. For ease of description, the power distribution system circuit interrupting device controllers may also be referred to herein collectively as the "controllers" in the plural and as the "controller" in the singular.

In addition, the power distribution system circuit interrupting devices contemplated by the present disclosure include, but are not limited to, fault interrupters, load break switches, capacitor switches and other overhead distribution switches. Non-limiting examples of fault interrupters include automatic circuit reclosers. For ease of description, the power distribution system circuit interrupting devices may also be referred to herein as the "interrupting devices" in the plural and the "interrupting device" in the singular.

Figure 1:
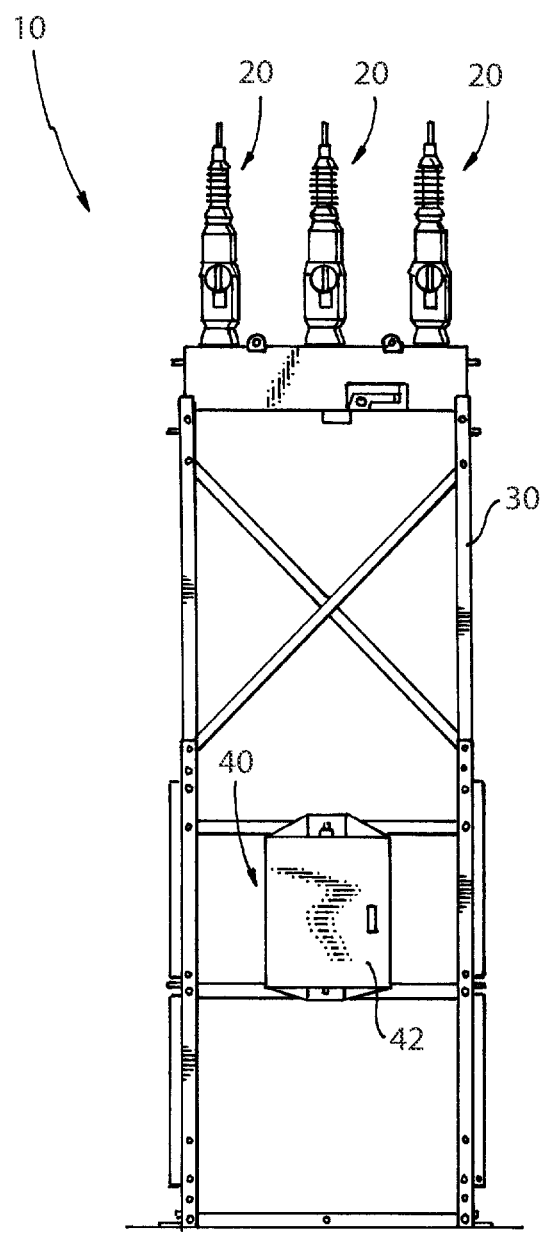
FIG. 1 is a front elevation view of an exemplary embodiment of an environment where an controller according to the present disclosure can be used, illustrating a tower having a power distribution system circuit interrupting device attached to the tower and elevated from the ground, and the controller incorporating an exemplary embodiment of an electronic control circuit according to the present disclosure attached to the tower closer to the ground to permit access by lineman and other technicians.
Figure 2:
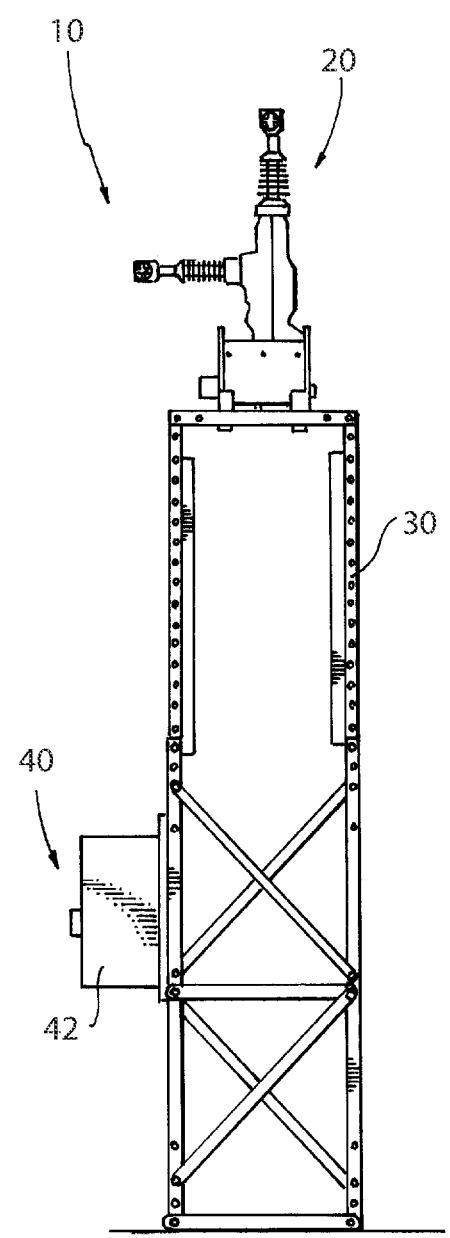
FIG. 2 is a side elevation view of the exemplary environment of the tower and controller of FIG. 1.

Referring now to FIGS. 1 and 2, an exemplary environment of the use of interrupting devices and controllers according to the present disclosure to protect one or more power conductors in an overhead power distribution network 10 is shown. In this exemplary environment, three interrupting devices 20 are attached to a utility tower 30 (or a utility pole) so that they are elevated from the ground, and a controller 40 is attached to the tower 30 closer to the ground to permit access by linemen and other technicians. The controller 40 is electrically connected to the interrupting devices 20 by one or more electrical cables (not shown) such that the controller 40 can monitor the operation of the interrupting devices 20 and control the operation of the interrupting devices 20. While FIGS. 1 and 2 show three interrupting devices 20 attached to the tower 30 (or utility pole), the present disclosure contemplates that less than three or more than three interrupting devices 20 may be attached to the tower and electrically connected to the controller 40. In this exemplary environment, the three interrupting devices 20 are part of a three-phase power distribution network such that each of the three interrupting devices 20 has a line side connected to a line side power conductor (not shown) and a load side connected to a load side power conductor (not shown) representing a phase in the three-phase power distribution network. When the interrupting device 20 is in a closed position, an electrically conductive path is created between the line and load side power conductors associated with a particular phase. When the interrupting device 20 is in an open position, the electrically conductive path between the line and load side power conductors is broken.

Figure 3:
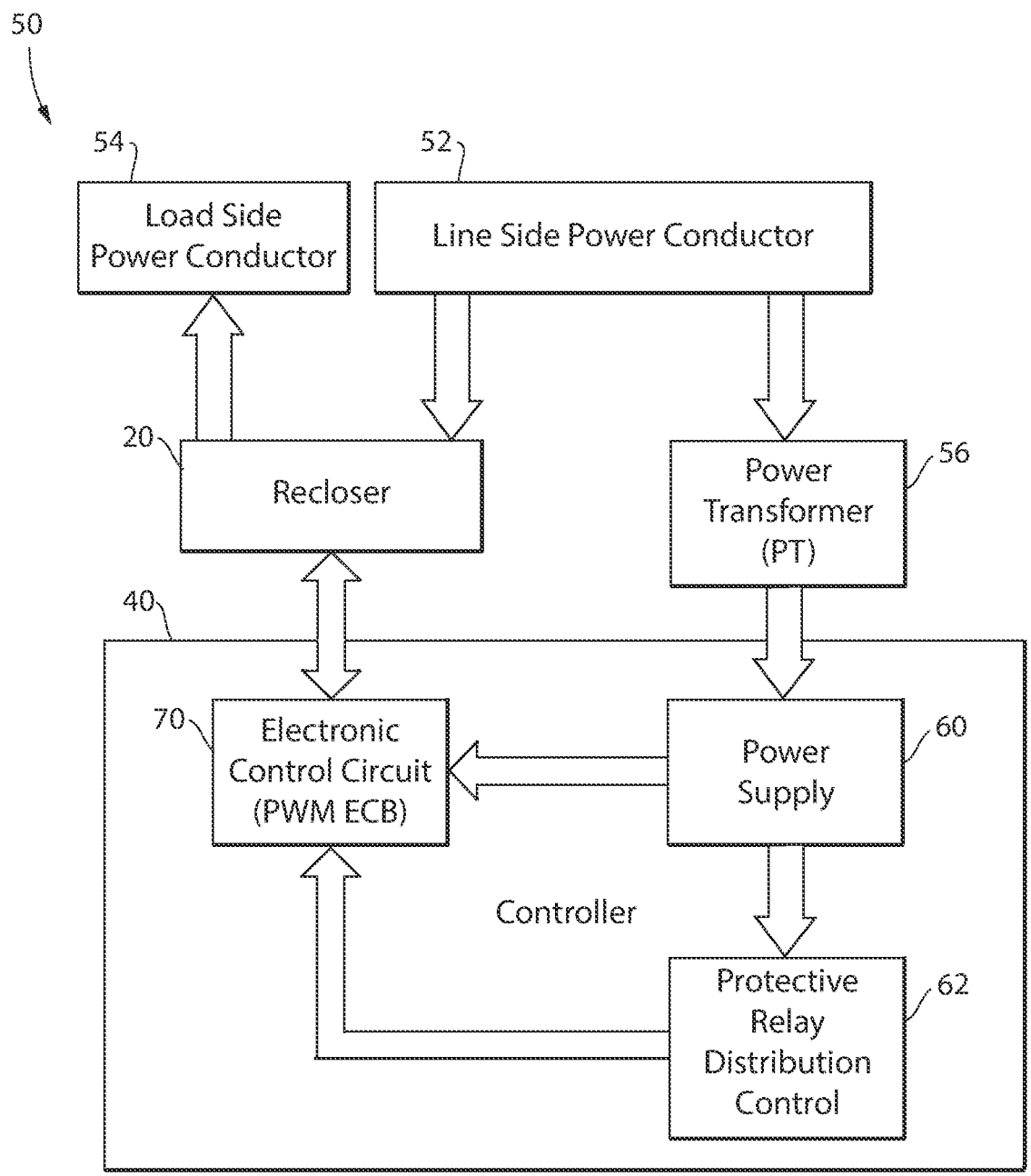
FIG. 3 is a block diagram of an exemplary embodiment of a power distribution system feed protected by the power distribution system circuit interrupting device and controller of FIG. 1, illustrating the controller incorporating the electronic control circuit according to the present disclosure.

Referring to FIG. 3, an exemplary embodiment of a network 50 for protecting a power distribution conductor using an automatic circuit recloser as the interrupting device 20 and a controller 40 is shown. In electric power distribution, automatic circuit reclosers are a type of circuit interrupting device designed for use with overhead electrical power distribution conductors to detect and interrupt momentary faults. Automatic circuit reclosers are also known as "reclosers" or "auto-reclosers." Generally, reclosers are high voltage/high current rated circuit breakers with integrated current and voltage sensors for monitoring the current and voltage on the power distribution conductors connected to the recloser, and a protection relay that can be energized or deenergized to make or break the electrically conductive path between the power distribution conductors. Generally, there are three major power distribution network operating voltages in which reclosers are rated for use. The first is about 15.5 kV; the second about 27 kV and the third is about 38 kV.

In the exemplary embodiment of FIG. 3, the voltage on the power conductors 52 and 54 is a medium voltage of about 27 kV. To provide operating power for the controller 40, a power transformer 56 is attached to the tower 30 (or utility pole) and electrically connected to the line side power conductor 52. In this exemplary embodiment, the power transformer 56 is a voltage control power transformer, which is single phase transformer used to supply control power in medium voltage switchgear and transformers. The power transformer 56 is used to provide electrical power to the controller 40. The secondary voltage (or output voltage) of the power transformer 56 is typically configured for 120/240V (series/parallel) operation. The output voltage of the power transformer 56 is electrically connected to a power supply 60 in the controller 40. The power supply 60 converts the 120/240 VAC from the power transformer 56 to lower AC/DC voltages, e.g., 12 VDC or 24 VDC. The lower AC/DC voltages are used to provide electrical operating power to other components forming the controller 40 to control the operation of the interrupting device, here recloser 20. For example, the controller 40 may also include a protective relay distribution control circuit 62, a battery backup system and battery charger (not shown), and an electronic control circuit 70 used to control the operation of the interrupting device 20, which in this example is a recloser. The protective relay distribution control circuit 62 may also be referred to herein as the "relay control circuit." The relay control circuit 62 processes input signals from current and voltage sensors within the recloser 20 and transferred to the controller 40 via the electronic control circuit 70, provides circuitry for manual control of the recloser 20 and supplies dry contacts to actuate drive electronics for energizing and de-energizing the protective relay within the recloser 20. As noted above, energizing or de-energizing the protective relay in the recloser 20, switches the recloser between an open position breaking the conductive path between power distribution conductors and a closed position making the conductive path between power distribution conductors. Thus, the relay control circuit 62 provides continuous monitoring of the interrupting device 20 sensors and provides remote input to the protective relay in the recloser 20. The relay control circuit 62 also provides control signals and timing to the electronic control circuit 70 that is used to initiate precisely timed open and close operations of the interrupting device 20, e.g., the recloser. The controller 40 also includes a sealed cabinet 42, seen in FIG. 1, which houses the power supply 60, the relay control circuit 62 and the electronic control circuit 70. Also included in the cabinet 42 that may be part of the controller 40 are various support components, such as a backup battery, a heater, etc. which are known in the art.

Figure 4:
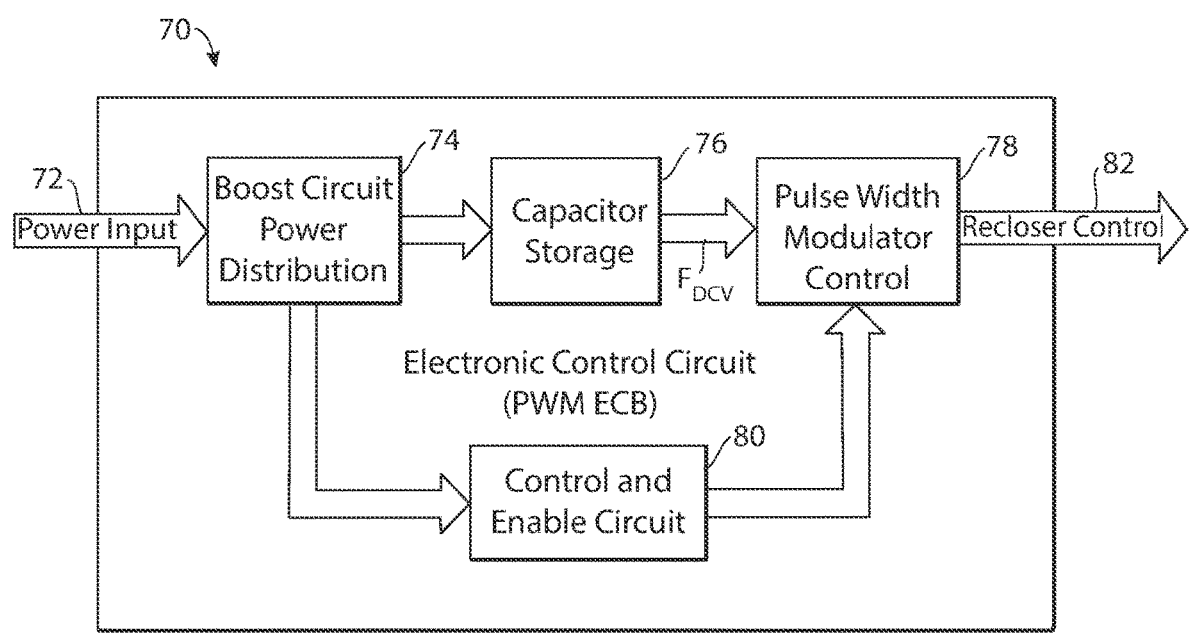
FIG. 4 is an exemplary block diagram of the electronic control circuit of FIG. 3.

Referring now to FIG. 4, an exemplary embodiment of the electronic control circuit 70 is shown. The electronic control circuit 70 provides a method of performing open and close operations for the interrupting device 20. The output power from the power supply 60 is provided to the electronic control circuit 70 at the input power terminal 72. The input power from the power supply 60 is low voltage DC, e.g., about 12 VDC or 24 VDC, that is provided to a boost circuit power distribution module 74. The boost circuit power distribution module 74 boosts the low voltage DC from the power supply 60 to a higher DC voltage, e.g., 180 VDC. The output of the boost circuit power distribution module 74 is fed to a capacitor storage unit 76 that is used to provide a fixed DC voltage "$F_{VDC}$" to a pulse width modulator control circuit 78. Preferably, the fixed voltage "$F_{VDC}$" stored by the capacitor storage unit 76 is sufficiently greater than the threshold DC voltage needed to drive the protective relay in the recloser 20. As noted above, a protective relay in a recloser is energized by a capacitor during operation of the recloser. In order to energize the protective relay in the recloser, the capacitor has to be charged to a predetermined threshold DC voltage specified by the manufacturer of the recloser. In the electronic control circuit 70 of the present disclosure, the capacitor storage unit 76 is charged to the fixed voltage "$F_{VDC}$" level so as to obtain repeatable recloser operations, e.g., an open operation or a close operation, without having to wait for the capacitor storage unit 76 to recharge. As an example, the fixed voltage "$F_{VDC}$" stored by the capacitor storage unit 76 is about 5 percent to about 100 percent greater that the threshold voltage needed to provide the necessary current to drive the protective relay solenoid in the recloser 20. As a non-limiting example, if the threshold voltage needed to drive the protective relay in the recloser 20 is 130 VDC, the fixed voltage "$F_{VDC}$" may be in the range of about 180 VDC and about 260 VDC. As a comparison, in traditional recloser controllers the capacitor would need to be recharged to a threshold voltage, e.g., 130 VDC, before a subsequent recloser operation can occur, e.g., an open operation or a close operation.

In other words, the electronic control circuit 70 of the present disclosure, allows the capacitor storage unit 76 to be charged to a higher voltage level, i.e., above the threshold voltage needed to drive the protective relay in the recloser 20, so that there is sufficient energy provided by the capacitor storage unit 76 for a series of operations of the protective relay in the recloser 20 without having to wait for the capacitor to charge. The pulse width modulator control circuit 78 and the control and enable circuit 80 control the amount of energy used to drive the protective relay in the recloser 20. The pulse width modulator control circuit 78 and the control and enable circuit 80 use current feedback from the recloser current sensor to get the same energy to the protective relay solenoid in the recloser 20 which is provided by the capacitor storage unit 76 for each operation of the protective relay in the recloser 20 independent of the starting voltage of the capacitor storage unit 76. By using a pulse width modulated signal from the pulse width modulator control circuit 78 and the control and enable circuit 80, the need to recharge the capacitor storage unit 76 after each operation of the protective relay in the recloser 20 is eliminated, thus permitting faster back-to-back operations, e.g., open and close operations, of the protective relay in the recloser 20. The faster back-to-back operations reduces outage time on the power distribution network.

Figure 5:
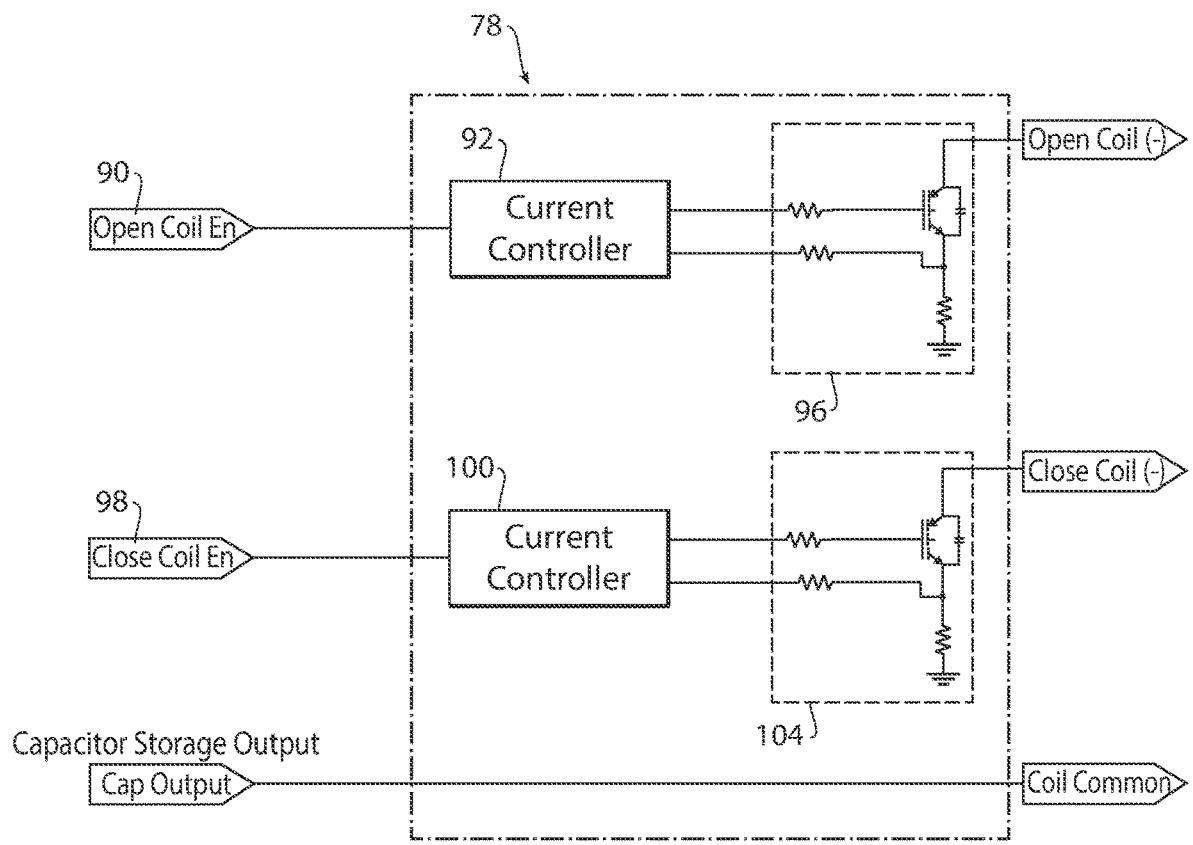
FIG. 5 is an exemplary circuit diagram of a pulse width modulator control circuit of the electronic control circuit of FIG. 4.
Figure 6:
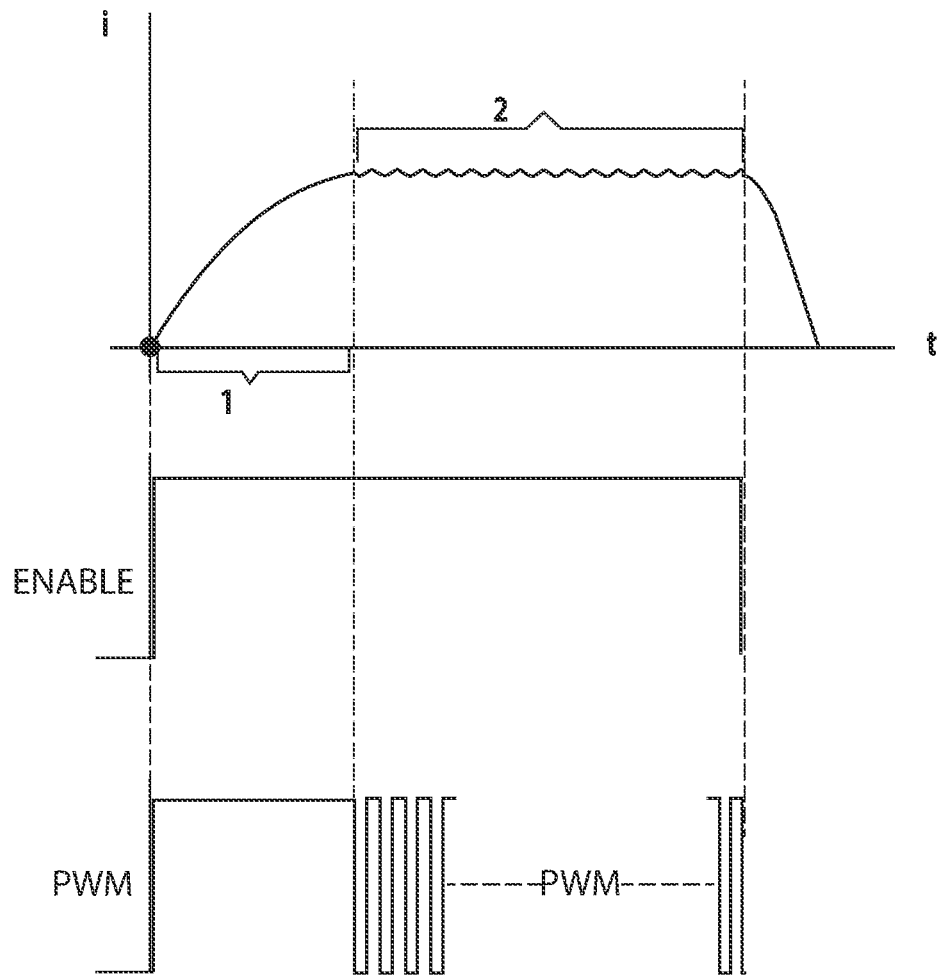
FIG. 6 is a timing diagram associated with the operation of the pulse width modulator control circuit of FIG. 5.

Referring to FIGS. 5 and 6, an exemplary embodiment of the pulse width modulator control circuit 78 is shown. The input to the "Open Coil En" terminal 90 is provided by the relay control circuit 62 of the controller 40, seen in FIG. 3. The Open Coil En input is supplied to a current controller 92. The current controller 92 provides a pulse width modulation signal to the coil driver circuit 96 which controls the energy delivered to the protective relays in the recloser 20. The pulse width modulation signal is based on monitoring the current flow to the driver solenoid in the recloser 20 using a resistor in the coil driver circuit 96. The input to the "Close Coil En" is provided by the relay control circuit 62 of the controller 40. The Close Coil En input is supplied to a current controller 100. The current controller 100 provides a pulse width modulation signal to the coil driver circuit 104 which controls the energy delivered to the protective relays in the recloser 20. The pulse width modulation signal is based on monitoring the current flow to the driver solenoid in the recloser 20 using a resistor in the coil driver circuit 104.

It is noted that solenoids and coils generally oppose a change in current flow. The pulse width modulator control circuit 78 will turn "on" and "off" the voltage to the protective relay solenoid in the recloser 20, at a predefined frequency starting with a longer ON period, as seen in FIG. 6. Over time (t) this increases the current (i) flow in the protective relay solenoid. When the desired steady state is reached, the pulse width modulator control circuit 78 applies a PWM signal which starts regulating the current through the protective relay solenoid in the recloser 20. The PWM signal regulates the ON and OFF periods to maintain the desired steady state current value to drive the protective relay solenoid. As a non-limiting example, the frequency of the PWM signal may be at least about 1 kHz and preferably about 20 kHz, and the duty cycle of the pulse may range from about 8% to about 100% to maintain the desired current value through the protective relay solenoid. This method of limiting current flow to a preferred steady state value is what controls the desired energy delivered to the protective relay solenoid in the recloser 20 as opposed to dumping the stored energy through field effect transistors (FET's) in traditional controls. As a result, the total energy delivered in a fixed period of time can be limited to the amount needed to operate the interrupting device 20, e.g., the recloser, independent of the voltage stored in the capacitor storage unit 76, which is much higher than the threshold voltage required. Limiting this energy to the required amount maintains reserve energy for subsequent operations of the recloser 20 without a need to recharge the capacitor storage unit 76. The pulse width modulator control circuit 78 also has a feedback loop which monitors current flow in the recloser 20 and continuously adjusts the open and close duration during each pulse.

Figure 7:
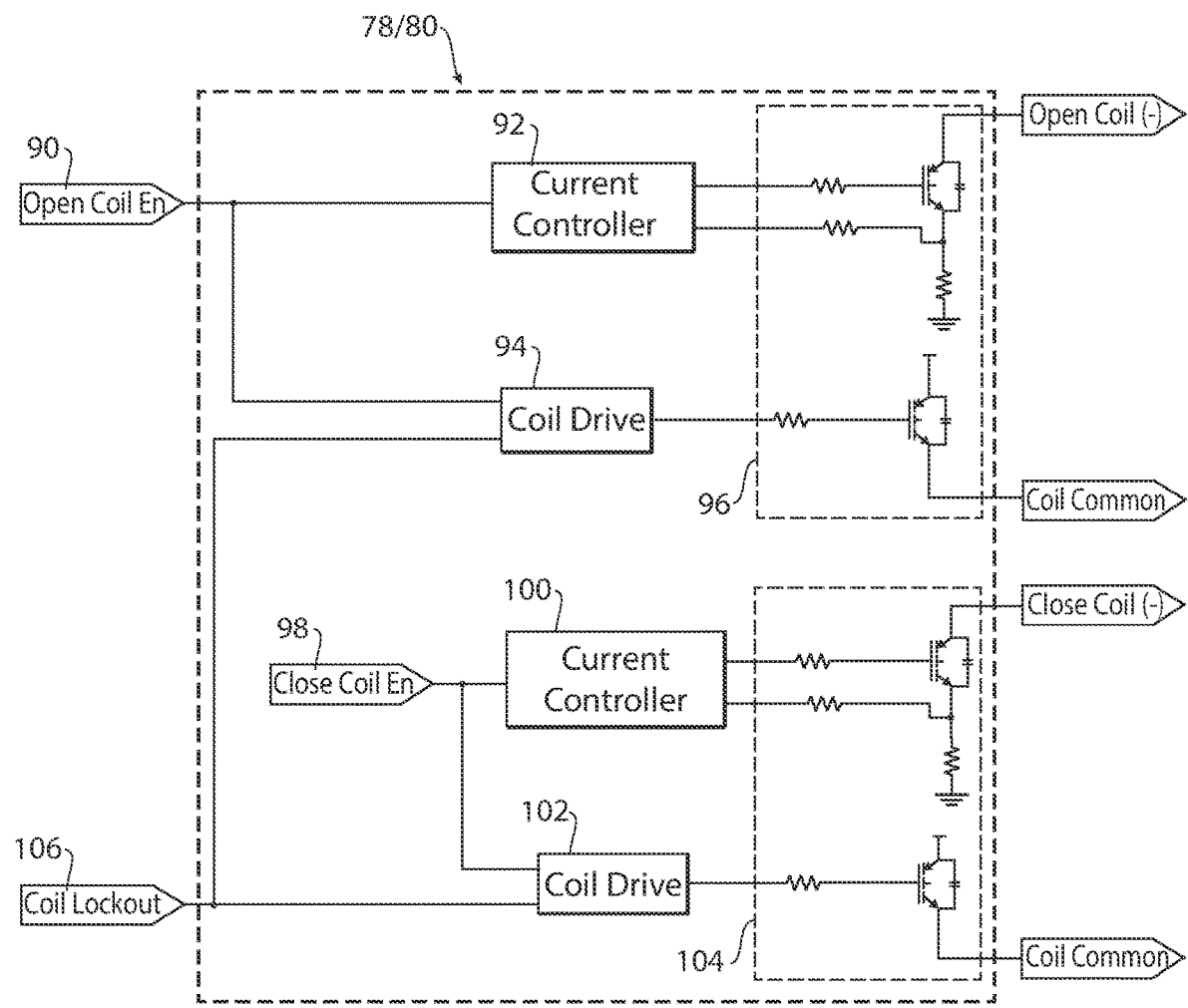
FIG. 7 is another exemplary circuit diagram of a pulse width modulator control circuit of the electronic control circuit of FIG. 4.

Referring now to FIG. 7, an exemplary embodiment of the pulse width modulator control circuit 78 and the control and enable circuit 80 is shown. In this exemplary embodiment, the input to the "Open Coil En" terminal 90 is provided by the relay control circuit 62 of the controller 40, seen in FIG.

3. The Open Coil En input is supplied to the current controller 92 and a coil drive 94. The current controller 92 provides a pulse width modulation signal to the coil driver circuit 96 which controls the energy delivered to the protective relays in the recloser 20. The pulse width modulation signal is based on monitoring the current flow to the driver solenoid in the recloser 20 using a resistor in the coil driver circuit 96. The input to the "Close Coil En" is provided by the relay control circuit 62 of the controller 40. The Close Coil En input is supplied to a current controller 100 and the coil drive 102. The current controller 100 provides a pulse width modulation signal to the coil driver circuit 104 which controls the energy delivered to the protective relays in the recloser 20. The pulse width modulation signal is based on monitoring the current flow to the driver solenoid in the recloser 20 using a resistor in the coil driver circuit 104. A signal on the "coil lockout" terminal 106 disables the coil drive 94 and the coil drive 102, which disables the coil driver circuit 96 and 104, respectively. As a result, the operation of the pulse width modulator control circuit 78 is disabled so that the protective relay in the interrupting device 20, here the recloser, causes the interrupting device 20 to remain in the open position so that the electrically conductive path between the line and load side power distribution conductors remains broken causing an open circuit.

As mentioned above, the present disclosure also provides embodiments of a controller for power system circuit interrupting devices that includes embodiments of a programmable electronic control circuit 70. Having a controller 40 with a programmable electronic control circuit 70 allows the controller 40 to operate with interrupting devices 20 of various manufacturers. As a result, electrical utilities and other purchasers and end users of power system interrupting devices 20 may purchase a single style controller 40 that is capable of controlling interrupting devices 20 of various manufacturers. Generally, in one exemplary embodiment, the programmable electronic control circuit 70 would be configured with a capacitive storage device, e.g., capacitor storage 76, that meets the capacitive storage requirements for the various interrupting devices 20 available on the market. The electronic control circuit 70 could then be configured or set with presets for each circuit interrupting device manufacture's configuration. Examples of such manufacturer's interrupting device 20 configurations include, for example, the ramp rate, the peak current, the modulation frequency, and/or the pulse duration of the signal energizing and deenergizing the protective relay within the circuit interrupting device 20. These configurations are typically unique configurations for each manufacturer for each interrupting device 20. In another exemplary embodiment, the electronic control circuit 70 may include programmable discreet components, such as programmable capacitive and/or resistive networks that can be configured or set to meet each circuit interrupting device's configuration requirements.

Figure 8:
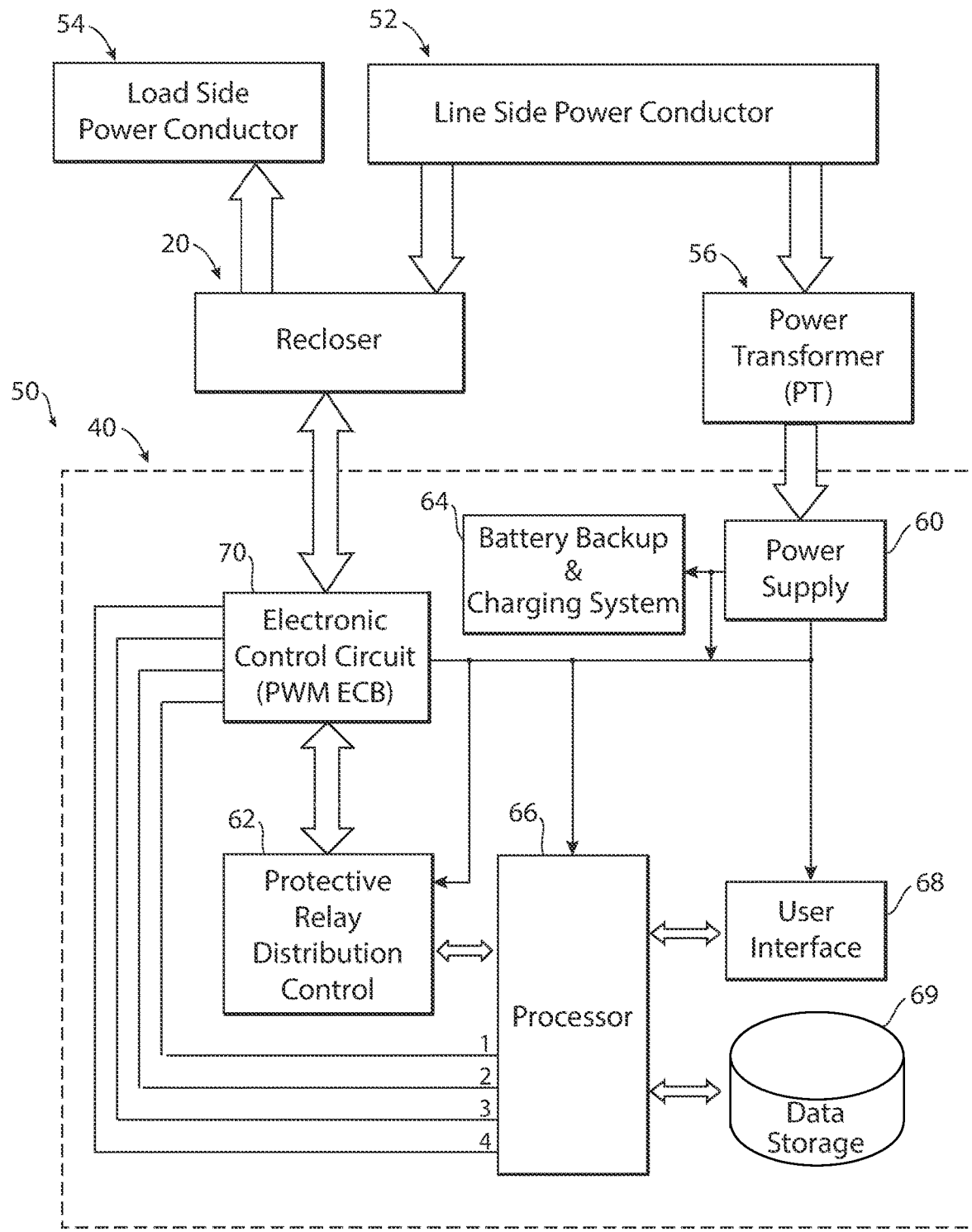
FIG. 8 is a block diagram of another exemplary embodiment of the controller of FIG. 3.

Referring now to FIG. 8, another exemplary embodiment of a network 50 for protecting a power distribution conductor using an automatic circuit recloser as the interrupting device 20 and a controller 40 is shown. In the exemplary embodiment of FIG. 8, the voltage on the power conductors 52 and 54 is a medium voltage of about 27 kV. To provide operating power for the controller 40, a power transformer 56 is attached to the tower 30 (or utility pole) and electrically connected to the line side power conductor 52. In this exemplary embodiment, the power transformer 56 is a voltage control power transformer, which is single phase transformer used to supply control power in medium voltage circuit interrupting devices, e.g. switchgear, and transformers. The power transformer 56 is used to provide electrical power to the controller 40. The secondary voltage (or output voltage) of the power transformer 56 is typically configured for 120/240V (series/parallel) operation. The output voltage of the power transformer 56 is electrically connected to a power supply 60 in the controller 40. The power supply 60 converts the 120/240 VAC from the power transformer 56 to lower AC/DC voltages, e.g., 12 VDC or 24 VDC. The lower AC/DC voltages are used to provide electrical operating power to other components forming the controller 40 to control the operation of the interrupting device 20, here a recloser. For example, the controller 40 may also include a protective relay distribution control circuit 62, a battery backup and charger system 64, and a programmable electronic control circuit 70 used to control the operation of the interrupting device 20. The protective relay distribution control circuit 62 may also be referred to herein as the "relay control circuit." The relay control circuit 62 and the processor 66 processes input signals from current and voltage sensors (not shown) within the recloser 20 and transferred to the controller 40 via the electronic control circuit 70. The relay control circuit 62 also provides circuitry for manual control of the recloser 20 and supplies dry contacts to actuate drive electronics for energizing and de-energizing the protective relay within the recloser 20. As noted above, energizing or de-energizing the protective relay in the recloser 20, switches the recloser between an open position breaking the conductive path between power distribution conductors and a closed position making the conductive path between power distribution conductors. Thus, the relay control circuit 62 and processor 66 provides continuous monitoring of the interrupting device 20 sensors and provides remote input to the protective relay in the recloser 20. The relay control circuit 62 and the processor 66 also provides control signals and timing to the electronic control circuit 70 that is used to initiate precisely timed open and close operations of the interrupting device 20, e.g., the recloser. The processor 66 is operatively connected to a user interface 68, data storage 69 and the electronic control circuit 70. In response to input from the user interface 68, the processor 66 retrieves from the data storage unit 69 information in the form of, for example, a predefined code, such as a four digit code, representing configuration settings for a particular interrupting device 20 from a particular manufacturer. This predefined code can be used to set the configuration parameters of the controller 40 to match those of the installed interrupting device 20.

Figure 9:
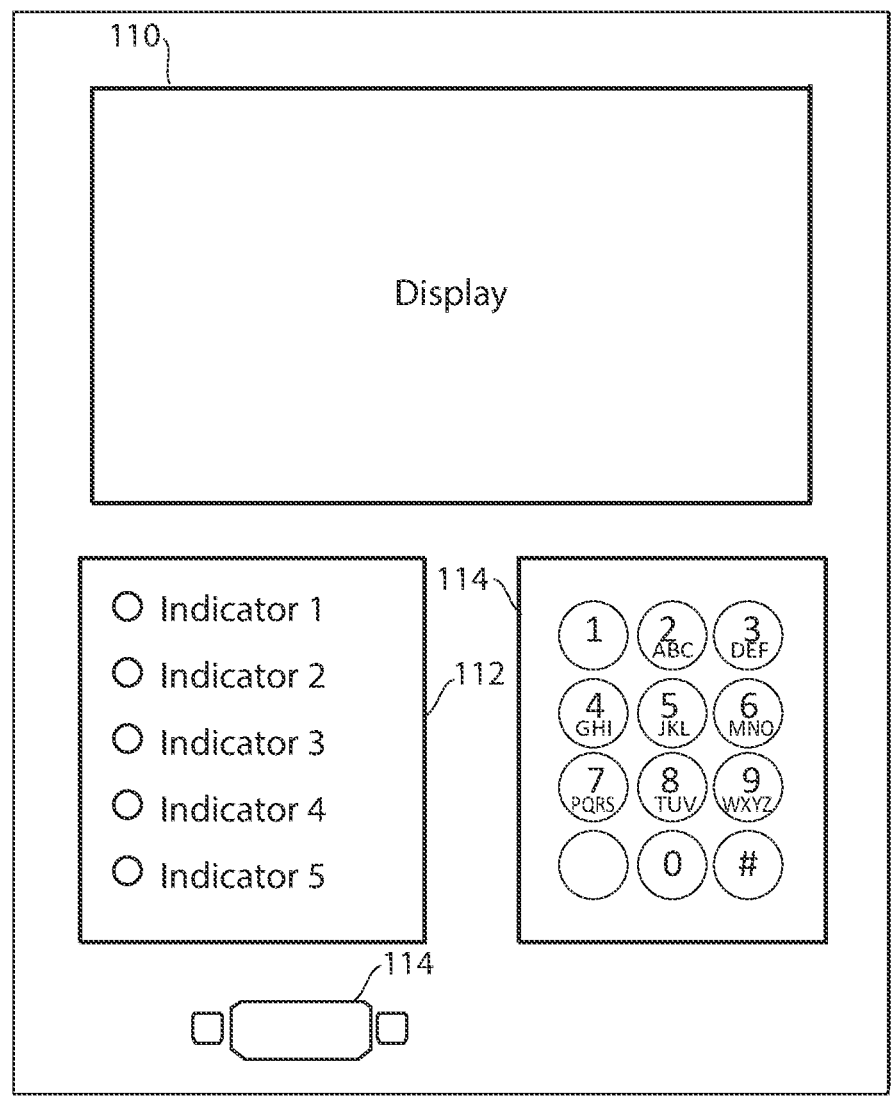
FIG. 9 is a block diagram of a user interface of the controller of FIG. 8.

The controller 40 also includes a sealed cabinet 42, seen in FIG. 1, which houses the power supply 60, the relay control circuit 62, the battery backup and charging system 64, the processor 66, the user interface 68, the data storage device 69, and the electronic control circuit 70. Also included in the cabinet 42 that may be part of the controller 40 are various support components, such as a heater, etc. which is known in the art. Within the sealed cabinet 42 is the user interface 68. Referring to FIG. 9, an exemplary embodiment of a user interface 68 is shown. In this exemplary embodiment, the user interface 68 includes a display device 110, an indicator panel 112, and a data entry device 114. The display device 110 provides a technician with information related to the controller 40 and/or the interrupting device or devices 20 being controlled by the controller 40. A non-limiting example of a suitable display is an LED display. The indicator panel 112 identifies, for example, status conditions of the controller 40 and/or status conditions of the interrupting device or devices 20 being controlled by the controller 40. The indicators in the indicator may be multi-colored LEDs that may illuminate as "green" when operation is normal and "red" when an error or fault is detected. The data entry device 114 may be any device through which a technician can enter data into the controller 40. In the exemplary embodiment shown, the data entry device 114 is a keypad. As noted above, the display device 110, indicator panel 112, and data entry device 114 are operatively connected to the processor 66. The user interface 68 may also include a connector 116 through which external devices may be connected to the controller 40. In the exemplary embodiment shown, the connector is a D-type connector. However, other connectors are contemplated including USB connectors. The connector 116 is operatively connected to external communication ports on the processor 66.

Figure 10:
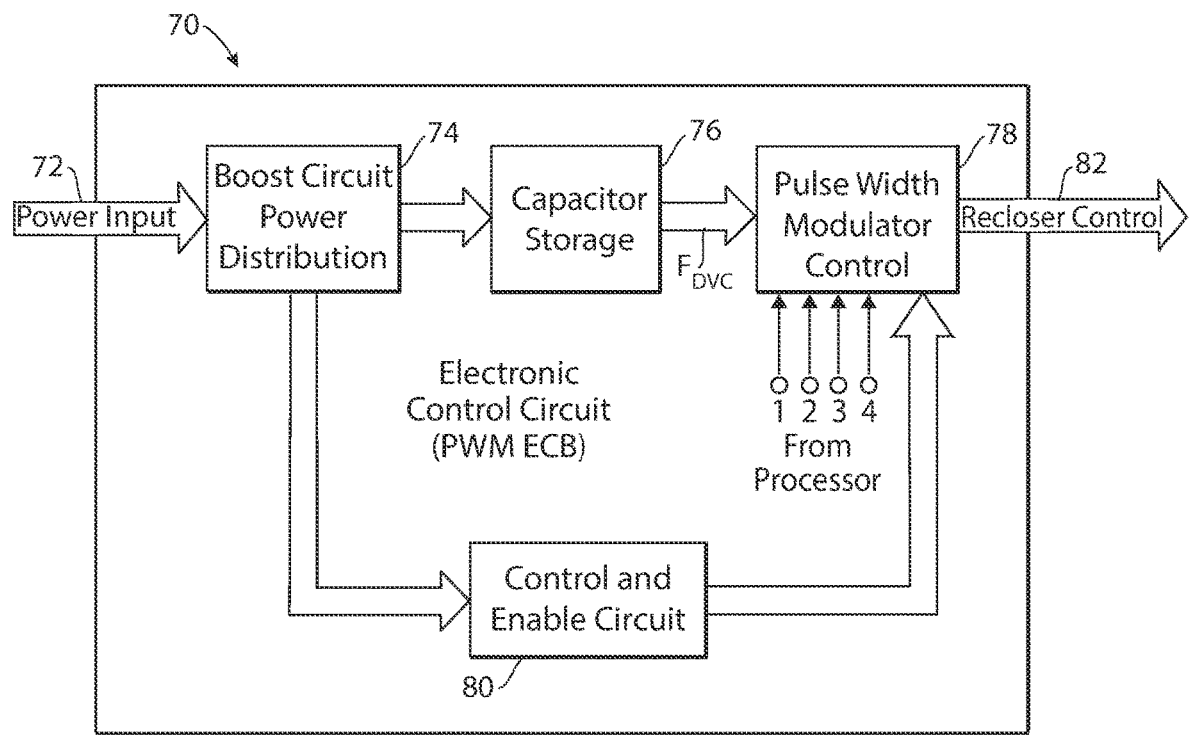
FIG. 10 is a block diagram of another exemplary embodiment of the electronic control circuit of FIG. 3.

Referring now to FIGS. 9 and 10, an exemplary embodiment of the electronic control circuit 70 is shown. The electronic control circuit 70 provides a method of performing open and close operations for the interrupting device 20. Initially and usually at installation, a technician programs the electronic control circuit 70 so that the output of the electronic control circuit is configured for the interrupting device 20 the controller 40 is to control. As an example, the technician may enter the model number and manufacturer of the interrupting device 20 into the controller 40 using the data entry device 114 and the display device 110 of the user interface 68. The processor 66 would then process the model number and manufacturer information entered and retrieve from the data storage device 69 the predefined code associated with the configuration data for the model number and manufacturer information. The processor 66 would send to the pulse width modulator control 78 the predefined code using connections 1-4. This predefined code would then configure the pulse width modulator control 78 to output a pulse width modulated signal with the characteristics to operate the interrupting device 20. After the technician programs the electronic control circuit 70, controller 40 is configured to control the interrupting device 20.

Returning to the method of performing open and close operations for the interrupting device 20, the output power from the power supply 60 is provided to the electronic control circuit 70 at the input power terminal 72. The input power from the power supply 60 is low voltage DC, e.g., about 12 VDC or 24 VDC, that is provided to a boost circuit power distribution module 74. The boost circuit power distribution module 74 boosts the low voltage DC from the power supply 60 to a higher DC voltage that is equal to or greater than the highest voltage needed to drive the protective relay across all interrupting devices to which the controller 40 can be configured to control. For example, if the highest voltage needed to drive the protective relays in all of the various interrupting devices on the market is about 180 VDC, the boost circuit power distribution module 74 would boost the low voltage DC from the power supply 60 to a value that is preferably greater than 180 VDC. The output of the boost circuit power distribution module 74 is fed to a capacitor storage unit 76 that is used to provide a fixed DC voltage "$F_{VDC}$" to the pulse width modulator control circuit 78. Preferably, the fixed voltage "$F_{VDC}$" stored by the capacitor storage unit 76 is sufficiently greater than the threshold DC voltage needed to drive the protective relay in the recloser 20.

As noted above, a protective relay in a recloser is energized by a capacitor in the controller during operation of the recloser. In order to energize the protective relay in the recloser, the capacitor has to be charged to a predetermined threshold DC voltage specified by the manufacturer of the recloser. In the electronic control circuit 70 of the present disclosure, the capacitor storage unit 76 is charged to the fixed voltage "$F_{VDC}$" level so as to obtain repeatable recloser operations, e.g., an open operation or a close operation, without having to wait for the capacitor storage unit 76 to recharge. As an example, the fixed voltage "$F_{VDC}$" stored by the capacitor storage unit 76 is about 5 percent to about 100 percent greater that the threshold voltage needed to provide the necessary current to drive the protective relay solenoid in the recloser 20. As a non-limiting example, if the threshold voltage needed to drive the protective relay in the recloser 20 is 130 VDC, the fixed voltage "$F_{VDC}$" may be in the range of about 180 VDC and about 260 VDC. As a comparison, in traditional recloser controllers the capacitor would need to be recharged to a threshold voltage, e.g., 130 DVC, before a subsequent recloser operation can occur, e.g., an open operation or a close operation.

In other words, the electronic control circuit 70 of the present disclosure, allows the capacitor storage 76 to be charged to a higher voltage level, i.e., above the threshold voltage needed to drive the protective relay in the recloser 20, so that there is sufficient energy provided by the capacitor 76 for a series of operations of the protective relay in the recloser 20 without having to wait for the capacitor to charge. The pulse width modulator control circuit 78, the control and enable circuit 80 and the predefined code supplied by the processor 66 controls the amount of energy used to drive the protective relay in the recloser 20. The pulse width modulator control circuit 78 and the control and enable circuit 80 use current feedback from the recloser current sensor to provide the same energy to the protective relay solenoid in the recloser 20 which is provided by the capacitor storage unit 76 for each operation of the protective relay in the recloser 20 independent of the starting voltage of the capacitor storage unit 76. By using a pulse width modulated signal from the pulse width modulator control circuit 78 and the control and enable circuit 80, the need to recharge the capacitor storage unit 76 after each operation of the protective relay in the recloser 20 is eliminated, thus permitting faster back-to-back operations, e.g., open and close operations, of the protective relay in the recloser 20. The faster back-to-back operations reduces outage time on the power distribution network.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electronic control circuit for one or more protective relays in a power distribution system circuit interrupting device, the electronic control circuit comprising:
   a boost circuit configured to increase a low DC input voltage to a higher DC output voltage that is greater than a threshold voltage used to drive the one or more protective relays;
   a capacitor storage unit electrically coupled to the boost circuit, the capacitor storage unit is configured to store the higher DC output voltage of the boost circuit and to output a fixed DC voltage that is greater than the threshold voltage; and a pulse width modulator control circuit electrically coupled to the capacitor storage unit and configured to receive the fixed DC voltage from the capacitor storage unit, the pulse width modulator control circuit being responsive to one or more input pulses from a control and enable circuit to turn "on" and "off" a voltage to the one or more protective relays in the power distribution system circuit interrupting device at a frequency of at least 1 KHz to regulate energy delivered from the capacitor storage unit to the one or more protective relays in the power distribution system circuit interrupting device for multiple instances of turning "on" and "off" the voltage to the one or more protective relays without waiting for the capacitor storage unit to charge to output the fixed DC voltage.

2. The electronic control circuit according to claim 1, wherein the low DC input voltage is in the range of about 12 VDC to about 24 VDC.

3. The electronic control circuit according to claim 1, wherein the higher DC output voltage is in the range of about 180 VDC to about 260 VDC.

4. The electronic control circuit according to claim 1, wherein the fixed DC voltage is in the range of about 180 VDC to about 260 VDC.

5. The electronic control circuit according to claim 1, wherein the pulse width modulator control circuit regulates energy delivered from the capacitor storage unit to the one or more protective relays by limiting current flow to the one or more protective relays to a predefined steady state value.

6. The electronic control circuit according to claim 1, wherein the pulse width modulator control circuit regulates energy delivered from the capacitor storage unit to the one or more protective relays by generating a pulse width modulated signal that is based on the current flow to the one or more protective relays.

7. The electronic control circuit according to claim 1, wherein the pulse width modulator control circuit uses feedback from one or more current sensors in the one or more protective relays to regulate energy delivered from the capacitor storage unit to the one or more protective relays.

8. An electronic control circuit for one or more protective relays in a power distribution system circuit interrupting device, the electronic control circuit comprising:
  a boost circuit configured to increase a low DC input voltage to a higher DC output voltage that is greater than a threshold voltage used to drive the one or more protective relays;
  a capacitor storage unit electrically coupled to the boost circuit, the capacitor storage unit is configured to store the higher DC output voltage of the boost circuit and to output a fixed DC voltage that is greater than the threshold voltage; and
  a pulse width modulator control circuit electrically coupled to the capacitor storage unit and configured to receive the fixed DC voltage from the capacitor storage unit, the pulse width modulator control circuit being responsive to one or more input pulses from a control and enable circuit to turn "on" and "off" a voltage to the one or more protective relays in the power distribution system circuit interrupting device at a frequency of at least 1 KHz to regulate energy delivered from the capacitor storage unit to the one or more protective relays for multiple instances of turning "on" and "off" the voltage to the one or more protective relays without waiting for the capacitor storage unit to charge to output the fixed DC voltage by limiting current flow to the one or more protective relays to a predefined steady state value.

9. The electronic control circuit according to claim 8, wherein the low DC input voltage is in the range of about 12 VDC to about 24 VDC.

10. The electronic control circuit according to claim 8, wherein the higher DC output voltage is in the range of about 180 VDC to about 260 VDC.

11. The electronic control circuit according to claim 8, wherein the fixed DC voltage is in the range of about 180 VDC to about 260 VDC.

12. The electronic control circuit according to claim 8, wherein the pulse width modulator control circuit regulates energy delivered from the capacitor storage unit to the one or more protective relays by generating a pulse width modulated signal that is based on the current flow to the one or more protective relays.

13. The electronic control circuit according to claim 8, wherein the pulse width modulator control circuit uses feedback current received from one or more current sensors in the one or more protective relays to regulate energy delivered from the capacitor storage unit to the one or more protective relays.

14. An electronic control circuit for one or more protective relays in a power distribution system circuit interrupting device, the electronic control circuit comprising:
  a boost circuit configured to increase a low DC input voltage to a higher DC output voltage that is greater than a threshold voltage used to drive the one or more protective relays;
  a capacitor storage unit electrically coupled to the boost circuit, the capacitor storage unit is configured to store the higher DC output voltage of the boost circuit and to output a fixed DC voltage that is greater than the threshold voltage; and
  a pulse width modulator control circuit electrically coupled to the capacitor storage unit and configured to receive the fixed DC voltage from the capacitor storage unit, the pulse width modulator control circuit is configured to turn "on" and "off" a voltage to the one or more protective relays in power distribution system circuit interrupting device at a frequency of at least 1 KHz to regulate energy delivered from the capacitor storage unit to the one or more protective relays for multiple instances of turning "on" and "off" the voltage to the one or more protective relays without waiting for the capacitor storage unit to charge to output the fixed DC voltage based on the current flow to the one or more protective relays.

15. The electronic control circuit according to claim 14, wherein the low DC input voltage is in the range of about 12 VDC to about 24 VDC.

16. The electronic control circuit according to claim 14, wherein the higher DC output voltage is in the range of about 180 VDC to about 260 VDC.

17. The electronic control circuit according to claim 14, wherein the fixed DC voltage is in the range of about 180 VDC to about 260 VDC.

18. The electronic control circuit according to claim 14, wherein the pulse width modulator control circuit uses feedback from one or more current sensors in the one or more protective relays to regulate energy delivered from the capacitor storage unit to the one or more protective relays.

* * * * *